United States Patent
Reyes et al.

(10) Patent No.: US 7,102,517 B2
(45) Date of Patent: Sep. 5, 2006

(54) TEST FIXTURE FOR EVALUATING RF IDENTIFICATION SYSTEM AND RELATED METHODS

(75) Inventors: Ray A. Reyes, New Windsor, NY (US); David L. Schmoke, Verbank, NY (US); Edward Sherwood, Wingdale, NY (US)

(73) Assignee: International Business Machines Corporation, Armonk, NY (US)

( * ) Notice: Subject to any disclaimer, the term of this patent is extended or adjusted under 35 U.S.C. 154(b) by 96 days.

(21) Appl. No.: 10/711,070

(22) Filed: Aug. 20, 2004

(65) Prior Publication Data

US 2006/0038682 A1  Feb. 23, 2006

(51) Int. Cl.
 *G08B 13/14* (2006.01)
(52) U.S. Cl. ............ 340/572.1; 340/10.1; 73/81
(58) Field of Classification Search ........ 340/572.1, 340/572.5, 10.1; 73/81, 84, 182
See application file for complete search history.

(56) References Cited

U.S. PATENT DOCUMENTS

| | | | |
|---|---|---|---|
| 4,218,745 A * | 8/1980 | Perkins .................. 716/4 |
| 6,104,291 A * | 8/2000 | Beauvillier et al. ....... 340/572.1 |
| 6,184,777 B1 * | 2/2001 | Mejia .................. 340/10.1 |
| 6,236,223 B1 * | 5/2001 | Brady et al. ............... 324/765 |
| 6,259,353 B1 * | 7/2001 | Berger et al. ............ 340/10.1 |
| 6,412,086 B1 * | 6/2002 | Friedman et al. .......... 714/733 |
| 6,868,233 B1 * | 3/2005 | Foltzer .................. 398/16 |
| 2004/0160233 A1 * | 8/2004 | Forster ................... 324/667 |
| 2004/0227616 A1 * | 11/2004 | Lafferty .................. 340/5.61 |

* cited by examiner

*Primary Examiner*—John Tweel, Jr.
(74) *Attorney, Agent, or Firm*—James J. Cioffi; Hoffman, Warnick & D'Alessandro LLC

(57) ABSTRACT

A test fixture for evaluating an RF identification system and related methods for evaluating an RF tag and/or an RF antenna, are disclosed. The test fixture provides predefined RF tag positions that can be used to test: read position, distance and antenna capability and adjustments. By placing an actual RF tag in each of the predefined positions, a read of the tag information can be performed. A three dimensional plot can then be established for the sensitivity field of the antenna. By placing the RF tag in various positions and orientations, the antenna can be adjusted until an optimum field is produced. The invention can also be used to determine RF tag performance within the optimized field.

19 Claims, 3 Drawing Sheets

TEST FIXTURE FOR EVALUATING RF IDENTIFICATION SYSTEM AND RELATED METHODS

BACKGROUND OF INVENTION

1. Technical Field

The present invention relates generally to radio frequency (RF) identification systems, and more particularly, to a test fixture for evaluating an RF identification system and related methods.

2. Related Art

Highly automated manufacturing facilities, such as those in the semiconductor industry, track product movement of a product throughout a facility using a radio frequency (RF) identification system. Typically, these systems include an RF tag mounted to the product and RF antennas placed at load ports within a manufacturing facility to sense and read RF tags on the product containers. The ability to read RF tags repeatedly and accurately within the manufacturing facility is a critical component of the automation system. An antenna's sensing field is three dimensional. The alignment of an antenna to the RF tag enables each load port that receives the product container having an RF tag to read the information contained on the RF tag. Tag reading, however, is affected by external fields, metal objects, and positioning and alignment of the antenna.

One challenge for these automation systems is making "in-the-field" adjustments to ensure proper reading of RF tags. "In-the-field" adjustments are difficult because, inter alia, surrounding metal, obstructions and other RF field parameters affect the shape of the antenna sensing fields. One approach to provide "in-the-field" adjustments is to conduct testing using a hand held field strength meter, which senses the strength and location of an antenna's sensing field. This approach, however, suffers from a number of drawbacks. First, field strength meters use a different antenna than the in-situ antenna. As a result, they do not replicate the actual tag and actual antenna interaction. Second, field strength meters are hand held and, therefore, prevent accurate repeatability of positioning during testing. As a result, field strength meters provide only a general indication of antenna performance because they do not accurately replicate the read capability of the RF tag in situ. Finally, since field strength meters evaluate an antenna's sensing field only, they provide no functioning that allows verification of tag performance.

In view of the foregoing, there is a need in the art for a solution that addresses the problems of the related art.

SUMMARY OF INVENTION

The invention includes a test fixture for evaluating an RF identification system and related methods for evaluating an RF tag and/or an RF antenna. The test fixture provides predefined RF tag positions that can be used to test: read position, distance and antenna capability and adjustments. By placing an actual RF tag in each of the predefined positions, a read of the tag information can be performed. A three dimensional plot can then be established for the sensitivity field of the antenna. By placing the RF tag in various positions and orientations, the antenna can be adjusted until an optimum field is produced. The invention can also be used to determine RF tag performance within the optimized field.

A first aspect of the invention is directed to an apparatus for evaluating a radio frequency (RF) identification system, the apparatus comprising: a test fixture including a base having a plurality of tag positions for locating an RF tag relative to an RF antenna.

A second aspect of the invention is directed to a method of evaluating a radio frequency (RF) identification system, the method comprising the steps of: placing a test fixture proximate an RF antenna of the RF identification system; positioning an RF tag at a plurality of tag positions on the test fixture; and evaluating sensing of the RF tag by the RF antenna at each of the tag positions.

A third aspect of the invention is directed to a method of evaluating a radio frequency (RF) identification system including an RF tag and an RF antenna for sensing the RF tag, the method comprising the steps of: placing a test fixture in proximity to the RF antenna; positioning the RF tag at a plurality of tag positions on the text fixture; evaluating sensing of the RF tag by the RF antenna at each of the tag positions; determining at least one of: a sensing field of the RF antenna and a sensitivity strength of the RF tag; and adjusting one of the RF tag and the RF antenna to ensure reading of the RF tag by the RF antenna during operation of the RF identification system.

The foregoing and other features of the invention will be apparent from the following more particular description of embodiments of the invention.

BRIEF DESCRIPTION OF DRAWINGS

The embodiments of this invention will be described in detail, with reference to the following figures, wherein like designations denote like elements, and wherein.

DETAILED DESCRIPTION

Figure 1:
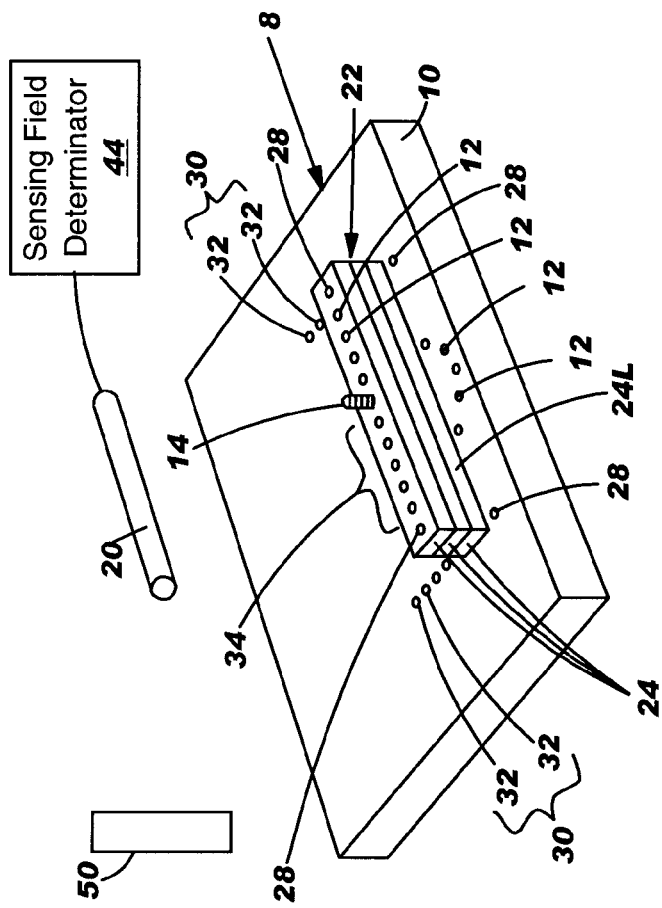
FIG. 1 shows a perspective view of a test fixture according to one embodiment of the invention.

With reference to the accompanying drawings, FIG. 1 shows a perspective view of a test fixture 8 for evaluating a radio frequency (RF) identification system, according to one embodiment of the invention. Test fixture 8 includes a base 10 having a plurality of tag positions 12 for locating an RF tag 14 relative to an RF antenna 20. Test fixture 8 also preferably includes a height adjustable mount 22 configured to hold RF tag 14 at a selected vertical position relative to RF antenna 20. Mount 22 is positionable at a selected one of a set 30 of mount positions 32 provided on base 10. Mount positions 32 extend in a linear direction such that the mount can be moved to a selected one of the mount positions 30, for reasons to be explained below. As used herein, "tag positions" 12 include a number of different positions, i.e., general position relative another structure, and/or a number of different orientations, i.e., angular position relative to another structure, for an RF tag 14. The different orientations may be provided, for example, by tag position 12 openings being angled or placed in the side of mount 22 (FIG. 2 only).

In one embodiment, mount 22 includes a plurality of stackable members 24. As shown in FIGS. 1 and 2, a lowermost stackable member 24L includes a positioner 26 configured to mate with at least one of a set of complementary mount positioners 32 on base 10 of test fixture 8. At least each other stackable member 24 (and perhaps lowermost stackable member 24L) includes at least one positioner 26 configured to mate with a complementary positioner 28 located on another stackable member 24. Stackable members 24 can be stacked to position RF tag 14 at a variety of vertical positions relative to RF antenna 20. The thickness of stackable member 24 can be selected to accommodate different vertical positions.

Figure 2:
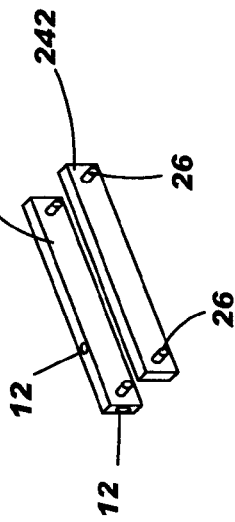
FIG. 2 shows a perspective view of an underside of one stackable member of the test fixture of FIG. 1.

In one embodiment, shown in FIGS. 1 and 2, each positioner 26, 28 includes one of a male coupler 26 and a female coupler 28 configured to mate with a complementary female coupler 28 and a complementary male coupler 26, respectively. Linearly disposed set 30 of mount positions 32 may be provided on base 10 to position height adjustable mount 22 in a selected one of mount positions 32 on base 10. In this fashion, RF tag 14 position can be adjusted in one horizontal direction and vertically. While one particular mechanism has been shown for positioning stackable members 24, it should be recognized that a variety of different mechanisms exist for positioning and holding member 24 in place.

Figure 3:
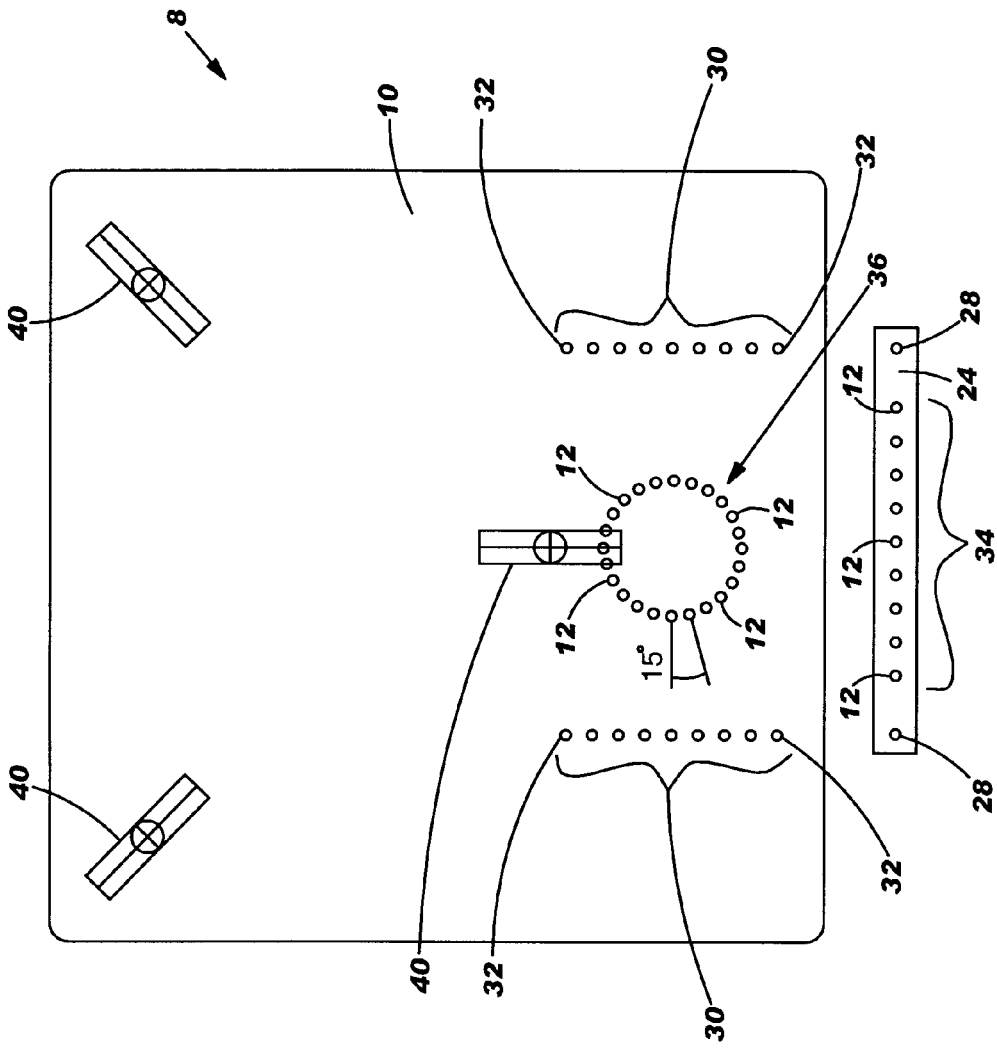
FIG. 3 shows a plan view illustrating positions for either placing an RF tag or holding a stackable member of FIG. 1 according to one embodiment of the invention.

With regard to the plurality of tag positions 12, each tag position is configured to receive RF tag 14. Referring to FIGS. 1 and 3, in one embodiment, a first set 34 of the plurality of tag positions 12 is provided on mount 22, i.e., at least an uppermost stackable member, in a first linear direction. Mount position 32 extend in a second linear direction that is substantially perpendicular to the first linear direction such that RF tag 14 can be positioned in a variety of three-dimensional tag positions 12 via first set 34, mount positions 32 and height adjustable mount 22. A second set 36 of the plurality of tag positions 12 may extend in a radial fashion on base 10. As shown, each tag position 12 of sets 32, 34, 36 is spaced at equal distances from adjacent positions, e.g., 15° in the radial set 36, however this is not necessary. In addition to linear set 34, each mount position 32 may also be used for positioning RF tag 14. In this case, each mount position 32 is preferably configured to have substantially the same shape and dimensions as a cross-section of RF tag 14, so that mount positions 32 can be used for either purpose. In this case, a first set 34 of the plurality of tag positions 12 extends in a first linear direction, and another set 30 of the plurality of tag positions 12 extends in a second linear direction that is substantially perpendicular to the first linear direction. In addition, a second set 36 of the plurality of tag positions 12 extend in a radial fashion on base 10.

Test fixture 8 is preferably made of a material that has no RF effect on the RF antenna, e.g., any non-metallic material. As shown in FIG. 3, test fixture 8 may also include a coupler 40 for positioning test fixture 8 as an element to which RF tag 14 is to be coupled in operation. The "element" could be any automation system component to which an RF tag 14 may be coupled. In the semiconductor industry, the element could be, for example, a front opening unified pod (FOUP), a front opening shipping boxes (FOSBs) or a reticle standard mechanical interface pods (RSPs). In this fashion, test fixture 8 can be used in-the-field of concern, e.g., on an automation system, such that any RF affecting parameter 50, e.g., surrounding machinery, metal, etc., that could affect RF antenna 20 sensing field can be evaluated.

Figure 4:
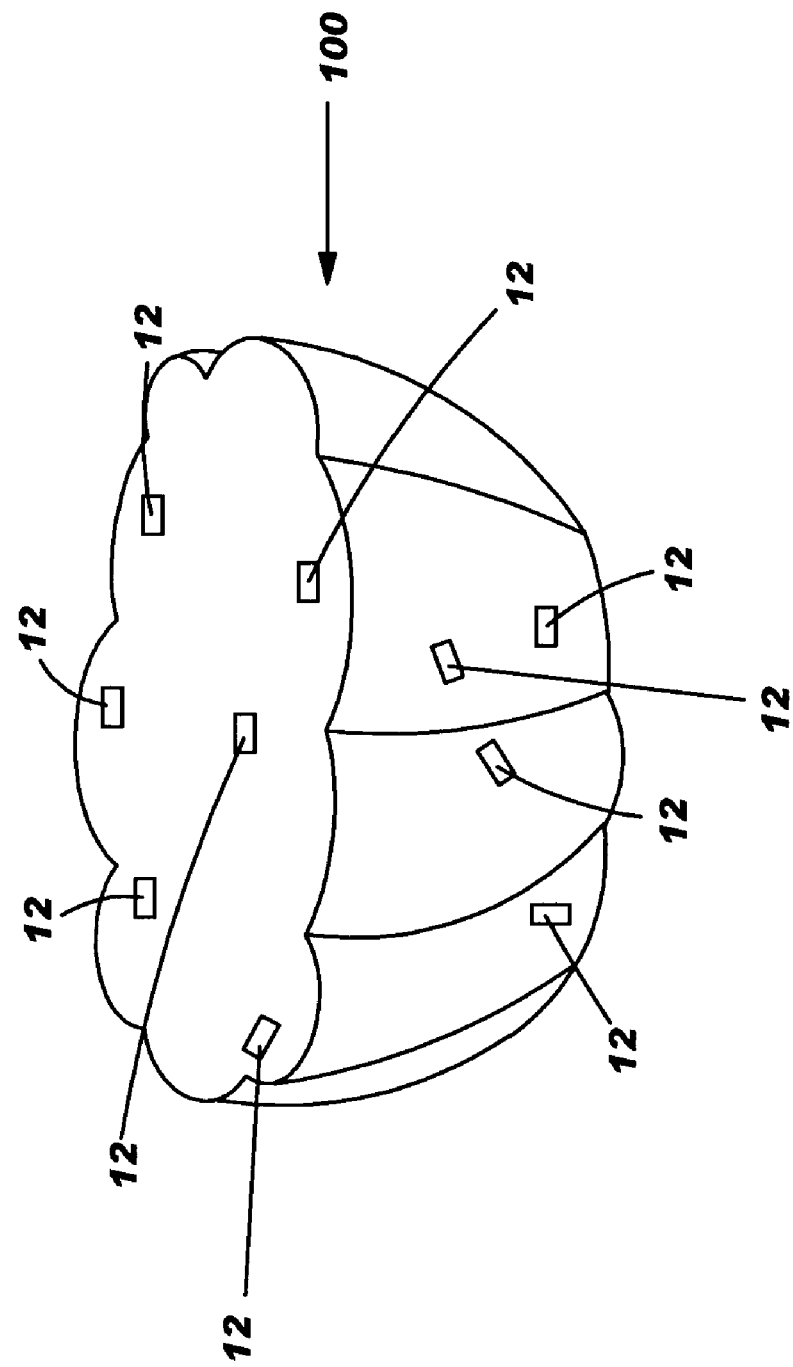
FIG. 4 shows a three-dimensional sensitivity field for an RF antenna and various tag positions for generating the sensitivity field.

The invention also includes a system for using test fixture 8 including an RF antenna 20 sensing field determinator 44, which may include any conventional computer system, a software program or other hardware. In one embodiment, since test fixture 8 is capable of locating RF tag 14 in three-dimensions, a sensing field can be modeled in three-dimensions, which adds accuracy to any adjustment made. FIG. 4 shows a three-dimensional sensitivity field 100 for an RF antenna and illustrative tag positions 12 (no all inclusive) for generating the sensitivity field.

The invention also includes method of evaluating a radio frequency (RF) identification system. In operation, test fixture 8 is placed proximate RF antenna 20 of the RF identification system. An RF tag 14 is then positioned at a plurality of tag positions 12 on test fixture 8. One of the tag positions 12 can be designated as an origin (i.e., 0,0,0 co-ordinate) such that all readings reference to the origin, i.e., depth, width, height and radial positioning. Evaluation of whether RF antenna 20 senses RF tag 14 at the plurality of tag positions 8 is conducted for each tag position. Additional steps of the method may include determining at least one of: a sensing field of RF antenna 20 and a sensitivity strength of RF tag 14. Another step may include, adjusting one of RF tag 14 and RF antenna 20 to ensure reading of RF tag 14 by RF antenna 20 during operation of the RF identification system. By placing RF tag 14 in known bad read points, RF antenna 20 can be adjusted until a good read is made. Where the sensing field of RF antenna 20 is determined, this step may include obtaining a three dimensional plot of the sensing field, as discussed above. In this case, at least one vertically different tag position is used, and preferably a number of vertically different tag positions are used. Where a sensitivity strength of RF tag 14 is determined, this step allows evaluation of RF tag 14 performance rather than simply providing a good/bad indication of RF tag 14 operation. As a result, the invention is able to eliminate weak or poor performing tags 14 by evaluating them with an optimized antenna 20. As noted above, where test fixture 8 is coupled by coupler 44 to an element of an automation system, the evaluating step includes consideration of the presence of an RF field affecting parameter 50 such as other machinery, etc. RF field affecting parameter 50 may exist in-the-field or be generated within a laboratory setting.

While this invention has been described in conjunction with the specific embodiments outlined above, it is evident that many alternatives, modifications and variations will be apparent to those skilled in the art. Accordingly, the embodiments of the invention as set forth above are intended to be illustrative, not limiting. Various changes may be made without departing from the spirit and scope of the invention as defined in the following claims.

The invention claimed is:

1. An apparatus for evaluating a radio frequency (RF) identification system, the apparatus comprising:
   a test fixture including a base having a plurality of tag positions for locating an RF tag relative to an RF antenna;
   wherein a first set of the plurality of tag positions extend in a first linear direction, and another set of the plurality of tag positions extends in a second linear direction that is substantially perpendicular to the first linear direction.

2. The apparatus of claim 1, further comprising a height adjustable mount configured to hold the RF tag at a selected vertical position relative to the RF antenna,
   wherein the mount is configured to be positioned at a selected one of a set of tag positions on the base of the test fixture.

3. The apparatus of claim 2, wherein the first set of the plurality of tag positions extending in the first linear direction is provided on the mount such that the RF tag can be positioned in a variety of three-dimensional tag positions.

4. The apparatus of claim 3, wherein a second set of the plurality of tag positions extend in a radial fashion on the base of the test fixture.

5. The apparatus of claim 2, wherein the mount includes a plurality of stackable members, a lowermost stackable member including a positioner configured to mate with at least one of the mount positions on the base of the test fixture, and at least each other stackable member includes at least one positioner configured to mate with a complementary positioner located on another stackable member.

6. The apparatus of claim 5, wherein each positioner includes one of a male coupler and a female coupler configured to mate with a complementary female coupler and a complementary male coupler, respectively.

7. The apparatus of claim 1, wherein a second set of the plurality of tag positions extend in a radial fashion on the base of the test fixture.

8. The apparatus of claim 1, wherein the test fixture is made of a material that has no RF effect on the RF antenna.

9. The apparatus of claim 1, wherein the test fixture further includes a coupler for positioning the test fixture as an element to which the RF tag is to be coupled in operation.

10. A system for using the test fixture of claim 1, the system comprising means for determining the RF antenna sensing field.

11. A method of evaluating a radio frequency (RF) identification system, the method comprising the steps of:
    placing a test fixture proximate an RF antenna of the RF identification system;
    positioning an RF tag at a plurality of tag positions on the test fixture; and
    evaluating sensing of the RF tag by the RF antenna at each of the tag positions.

12. The method of claim 11, wherein the plurality of tag positions includes at least one of: at least one vertically different tag position and at least one different orientation.

13. The method of claim 11, wherein the evaluating step includes obtaining a three dimensional plot of a sensing field of the RF antenna.

14. The method of claim 11, further comprising the step of adjusting one of the RF tag and the RF antenna to ensure reading of the RF tag by the RF antenna.

15. The method of claim 11, wherein the evaluating step includes determining at least one oft a sensing field of the RF antenna and a sensitivity strength of the RF tag.

16. The method of claim 11, wherein the evaluating step is conducted in the presence of an RF field affecting parameter.

17. A method of evaluating a radio frequency (RF) Identification system including an RF tag and an RF antenna for sensing the RF tag, the method comprising the steps of:
    placing a test fixture in proximity to the RF antenna;
    positioning the RF tag at a plurality of tag positions on the text fixture;
    evaluating sensing of the RF tag by the RF antenna at each of the tag positions;
    determining at least one oft a sensing field of the RF antenna and a sensitivity strength of the RF tag; and
    adjusting one of the RF tag and the RF antenna to ensure reading of the RF tag by the RE antenna during operation of the RF identification system.

18. The method of claim 17, wherein the determining step includes obtaining a three dimensional plot of a sensing field of the RF antenna.

19. The method of claim 17, wherein the placing step includes mounting the fixture to an in-the-field location.

* * * * *

UNITED STATES PATENT AND TRADEMARK OFFICE
CERTIFICATE OF CORRECTION

| | | |
|---|---|---|
| PATENT NO. | : 7,102,517 B2 | Page 1 of 1 |
| APPLICATION NO. | : 10/711070 | |
| DATED | : September 5, 2006 | |
| INVENTOR(S) | : Reyes et al. | |

It is certified that error appears in the above-identified patent and that said Letters Patent is hereby corrected as shown below:

Column 6, line 21, please remove "oft" and insert --of--.

Signed and Sealed this

Fifth Day of December, 2006

JON W. DUDAS
*Director of the United States Patent and Trademark Office*